(12) United States Patent
Binshtok et al.

(10) Patent No.: US 7,039,135 B2
(45) Date of Patent: May 2, 2006

(54) INTERFERENCE REDUCTION USING LOW COMPLEXITY ANTENNA ARRAY

(75) Inventors: Nir Binshtok, Tel Aviv (IL); Daniel Yellin, Raanana (IL)

(73) Assignee: D.S.P.C. Technologies Ltd., Petach Tikva (IL)

(*) Notice: Subject to any disclaimer, the term of this patent is extended or adjusted under 35 U.S.C. 154(b) by 190 days.

(21) Appl. No.: 09/976,200

(22) Filed: Oct. 11, 2001

(65) Prior Publication Data

US 2003/0072396 A1    Apr. 17, 2003

(51) Int. Cl.
*H03D 1/04* (2006.01)
(52) U.S. Cl. .................. 375/346; 375/349; 375/347
(58) Field of Classification Search ............... 375/136, 375/147, 337, 299, 347, 349, 346, 130, 348; 370/320, 335, 342, 441; 455/65, 132, 737, 455/91, 116, 562
See application file for complete search history.

(56) References Cited

U.S. PATENT DOCUMENTS

| 6,058,318 | A  | * | 5/2000  | Kobayakawa et al. ... 455/562.1 |
| 6,141,393 | A  | * | 10/2000 | Thomas et al. ............ 375/347 |
| 6,167,039 | A  | * | 12/2000 | Karlsson et al. ........... 370/342 |
| 6,172,970 | B1 | * | 1/2001  | Ling et al. .................. 370/347 |
| 6,177,906 | B1 | * | 1/2001  | Petrus ........................ 342/378 |
| 6,191,736 | B1 | * | 2/2001  | Yukitomo et al. .......... 342/383 |
| 6,201,955 | B1 | * | 3/2001  | Jasper et al. ............. 455/277.2 |
| 6,385,181 | B1 | * | 5/2002  | Tsutsui et al. .............. 370/335 |
| 6,400,318 | B1 | * | 6/2002  | Kasami et al. .............. 342/383 |

(Continued)

FOREIGN PATENT DOCUMENTS

| EP | 1091447    | 4/2001 |
| EP | 1091447 A1 | 4/2001 |

OTHER PUBLICATIONS

Chan, Peter, et al., "Low-Complexity Antenna Diversity Receivers for WCDMA Handsets", *IEEE*, (May 16, 1999), 1901-1905.

Winters, Jack, "Optimum Combining in Digital Mobile Radio with Cochannel Interference", *IEEE Transactions on Vehicular Technology*, vol. VT-3, No. 3, (Aug. 1984),144-155.

(Continued)

*Primary Examiner*—Emmanuel Bayard
(74) *Attorney, Agent, or Firm*—Schwegman, Lundberg, Woessner & Kluth, P.A.

(57) ABSTRACT

Interference reduction is achieved within a communication device using a low complexity antenna array. In at least one embodiment, phase and magnitude values associated with an antenna element within a low complexity array are dynamically adjusted during device operation in a manner that enhances a predetermined quality criterion such as signal to interference and noise ratio (SINR).

29 Claims, 5 Drawing Sheets

U.S. PATENT DOCUMENTS

| | | | |
|---|---|---|---|
| 6,407,719 B1* | 6/2002 | Ohira et al. | 343/893 |
| 6,449,469 B1* | 9/2002 | Miyahara | 455/273 |
| 6,504,506 B1* | 1/2003 | Thomas et al. | 342/383 |
| 6,600,935 B1* | 7/2003 | Hiramatsu | 455/562.1 |
| 6,647,276 B1* | 11/2003 | Kuwahara et al. | 455/562.1 |
| 6,665,286 B1* | 12/2003 | Maruta et al. | 370/342 |
| 6,754,511 B1* | 6/2004 | Halford et al. | 455/562.1 |
| 6,765,969 B1* | 7/2004 | Vook et al. | 375/259 |
| 6,847,803 B1* | 1/2005 | Rauhala et al. | 455/63.1 |
| 2002/0181627 A1* | 12/2002 | Wengler | 375/347 |

OTHER PUBLICATIONS

Winters, Jack, "Optimum Combining in Digital Mobile Radio with Cochannel Interference", *IEEE vol. 47 No. 3*, (Aug. 3, 1984),144-155.

Chan, P. W., et al., "Low-Complexity Antenna Diversity Receivers for WCDMA Handsets", *Vehicular Technology Conference, IEEE 49th Houston,* (May 1999), 1901-1905.

* cited by examiner

INTERFERENCE REDUCTION USING LOW COMPLEXITY ANTENNA ARRAY

FIELD OF THE INVENTION

The invention relates generally to communication systems and, more particularly, to interference reduction techniques for use therein.

BACKGROUND OF THE INVENTION

In a cellular communication system, a plurality of wireless base stations are typically used to provide communication services to mobile users within the system. Each base station will often service multiple users within a coverage region or cell associated with the base station. To allow multiple users to share a base station, a multiple access scheme is typically employed. One multiple access technique that is becoming increasingly popular is code division multiple access (CDMA). In a CDMA-based system, a plurality of substantially orthogonal codes (usually taking the form of pseudo-random noise sequences) are used to spread spectrum modulate user signals within the system. Each modulated user signal has an overlapping frequency spectrum with other modulated user signals associated with the base station. However, because the underlying modulation codes are orthogonal, each user signal can be independently demodulated by performing a correlation operation using the appropriate code.

In at least one CDMA-based cellular standard, each of the base stations in a system maintains a pilot channel that continuously transmits a predetermined pilot sequence. These pilot signals may then be utilized by users in the system to perform, for example, channel estimation, handover operations, and/or other functions. Pilots from different base stations are sometimes distinguished by a time offset between individual base stations. Thus, a pilot having a specific time offset (from, for example, an absolute time reference) will be known to have come from a corresponding base station. As can be appreciated, a communication device operating within a cellular-based system implementing CDMA will often receive overlapping communication signals from a variety of different sources (e.g., other base stations, etc.). These overlapping signals represent interference in the system and can degrade system performance. Any reduction in such interference, therefore, may enhance the quality of the corresponding communication link or increase the capacity of the system. Thus, there is a general need for methods and structures to reduce interference in cellular communication systems.

DETAILED DESCRIPTION

Figure 1:
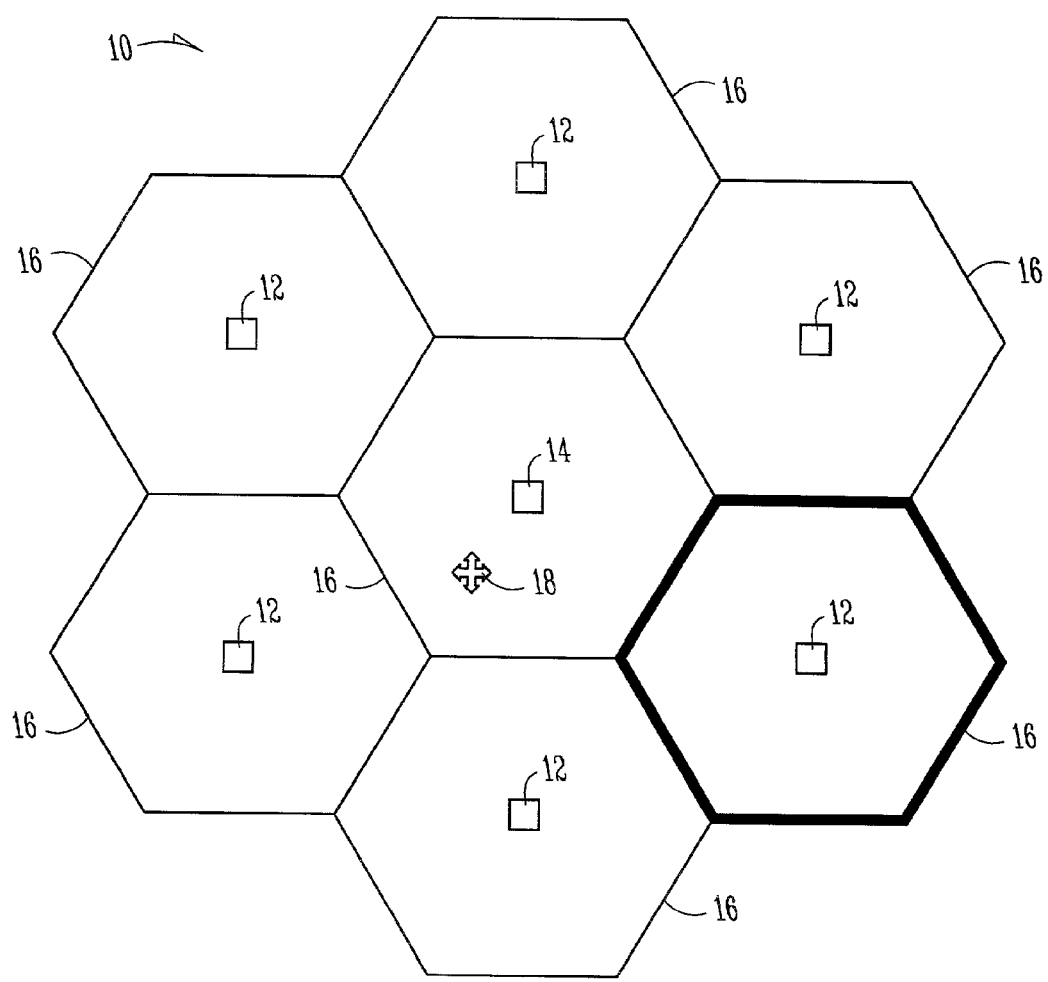
FIG. 1 is a simplified top view illustrating a cellular communication system that can utilize the principles of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to methods and structures for reducing interference within a communication system using a relatively low complexity antenna arrangement. The methods and structures can be used, for example, within a mobile communicator unit (e.g., a cellular telephone, etc.) to reduce the impact of potentially interfering signals. Two or more antenna elements are provided within a communication device, at least one of which has an adjustable weight (e.g., magnitude and/or phase). The weight of the adjustable element(s) is adapted during system operation in a manner that enhances a preselected interference-related quality criterion (e.g., signal to interference and noise ratio (SINR)). The inventive principles can be implemented in a variety of different communication systems and devices and are particularly beneficial for use within cellular-type communication systems implementing CDMA techniques.

FIG. 1 is a simplified top view illustrating a cellular communication system 10 that can utilize the principles of the present invention. As illustrated, the cellular communication system 10 includes a plurality of base stations 12, 14 that are physically distributed within an area. Each of the base stations 12, 14 has a corresponding coverage region or cell 16 within which the base station 12, 14 provides wireless communication services to mobile users. As used herein, the term servicing base station refers to the base station that is presently providing communication services to a particular user. For example, with reference to FIG. 1, base station 14 is acting as the servicing base station for mobile user 18 who is located within the cell 16 of base station 14. Mobile user 18 will typically receive signals from a number of base stations 12 within the system 10 in addition to the servicing base station 14. As described previously, in a CDMA-based system, the signals received from the various base stations may have overlapping spectrums. As can be appreciated, these overlapping signals can negatively impact the quality of communication within the system 10.

Figure 2:
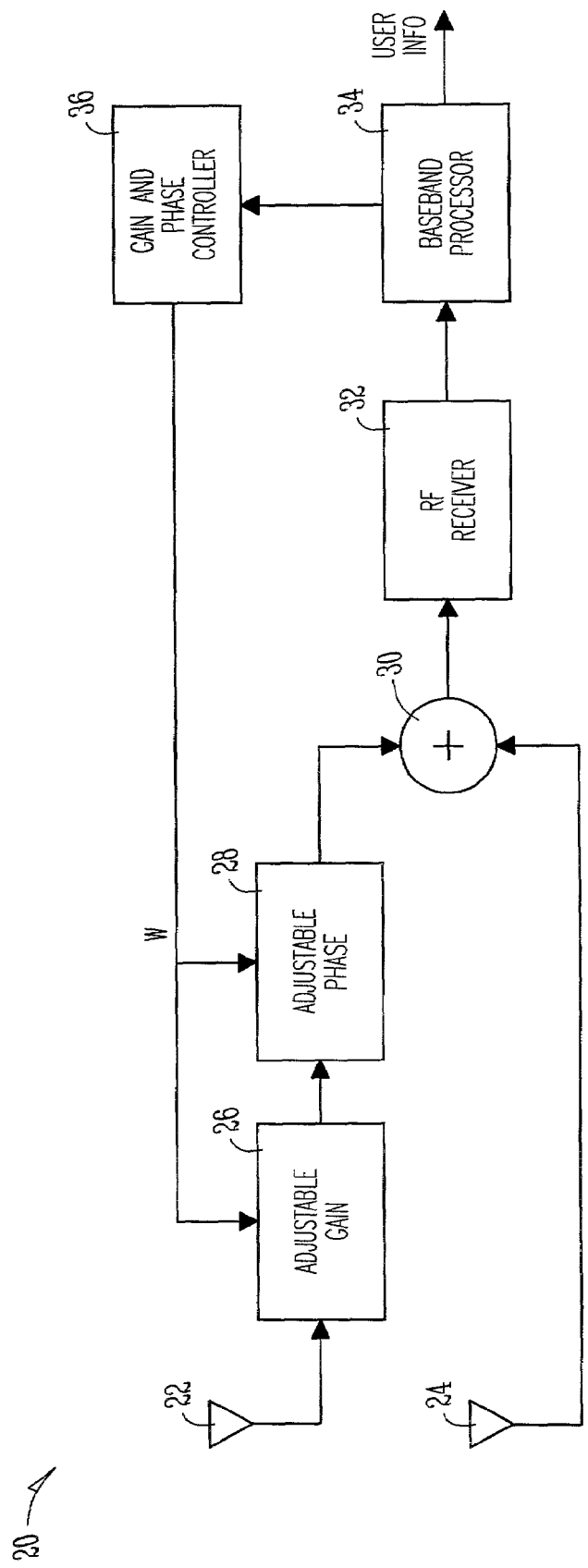
FIG. 2 is a block diagram illustrating a receiver system in accordance with an embodiment of the present invention that is capable of achieving reduced interference.

FIG. 2 is a block diagram illustrating a receiver system 20 in accordance with an embodiment of the present invention. As will be described in greater detail, the receiver system 20 is capable of outputting a received signal having reduced interference within a corresponding communication device. In at least one application, the receiver system 20 is implemented within a mobile communication device that is operative within a cellular-based communication system. The mobile communication device can include, for example, a cellular telephone, a pager, a laptop computer or personal digital assistant (PDA) having wireless transceiver functionality, and others. As illustrated, the receiver system 20 includes: first and second antenna elements 22, 24, an adjustable gain unit 26, an adjustable phase unit 28, a combiner 30, a radio frequency (RF) receiver 32, a baseband processor 34, and a gain and phase controller 36. The first and second antenna elements 22, 24 are operative for receiving radio frequency (RF) communication signals from the surrounding environment. The RF communication signals received by the first and second antenna elements 22, 24 may include, for example, signal components from a number of different base stations. The adjustable gain unit 26 and the adjustable phase unit 28 are operative for controllably varying the magnitude and phase, respectively, associated with the first antenna element 22. The combiner 30 combines the output signals of the first and second antenna elements 22, 24 and delivers the combined signal to the RF receiver 32.

The RF receiver 32 processes the combined signal to generate a baseband communication signal. The baseband processor 34 processes the baseband signal to extract user information associated with a user of the communication device. The baseband processor 34 also delivers information derived from the baseband signal to the gain and phase controller 36. The gain and phase controller 36 uses the information from the baseband processor 34 to generate gain and phase control information for the adjustable gain and phase units 26, 28. The gain and phase control information generated by the gain and phase controller 36 is dynamically adjusted during system operation in a manner that reduces interference within the receiver system 20. In a preferred approach, the gain and phase control information is adjusted to optimize a preselected interference-related quality criterion (e.g., SINR). In this manner, the gain and phase controller 36 can adjust the position of the composite receive beam of the receiver system 20 to favor the servicing base station while avoiding other base stations in the vicinity (particularly those with high powers).

As described above, the outputs of the first and second antenna elements 22, 24 are combined within the combiner 30 before RF processing is performed within the RF receiver 32. Thus, only a single RF path (e.g., one intermediate frequency (IF) section, one analog to digital converter, etc.) needs to be provided within the receiver system 20 even though multiple antenna elements are being used. Conventional phased array principles are relied upon to control the receive beam. Any of a wide variety of different antenna types can be used for the antenna elements 22, 24. For applications within handheld communicators, the antenna elements 22, 24 will preferably be relatively inexpensive structures having a relatively low profile. Some antenna types that may be used include, for example, microstrip patches, dipoles, monopoles, dielectric, printed, inverted F, slots, and others. In at least one embodiment of the invention, two (or more) different types of antenna element are used within a communication device. Also, a better quality antenna element may be used for the non-adjustable antenna element(s) (e.g., second element 24) than for the adjustable element(s) (e.g., first element 22), or vice versa. The antenna elements within a communication device can have the same or different polarizations.

Figure 3:
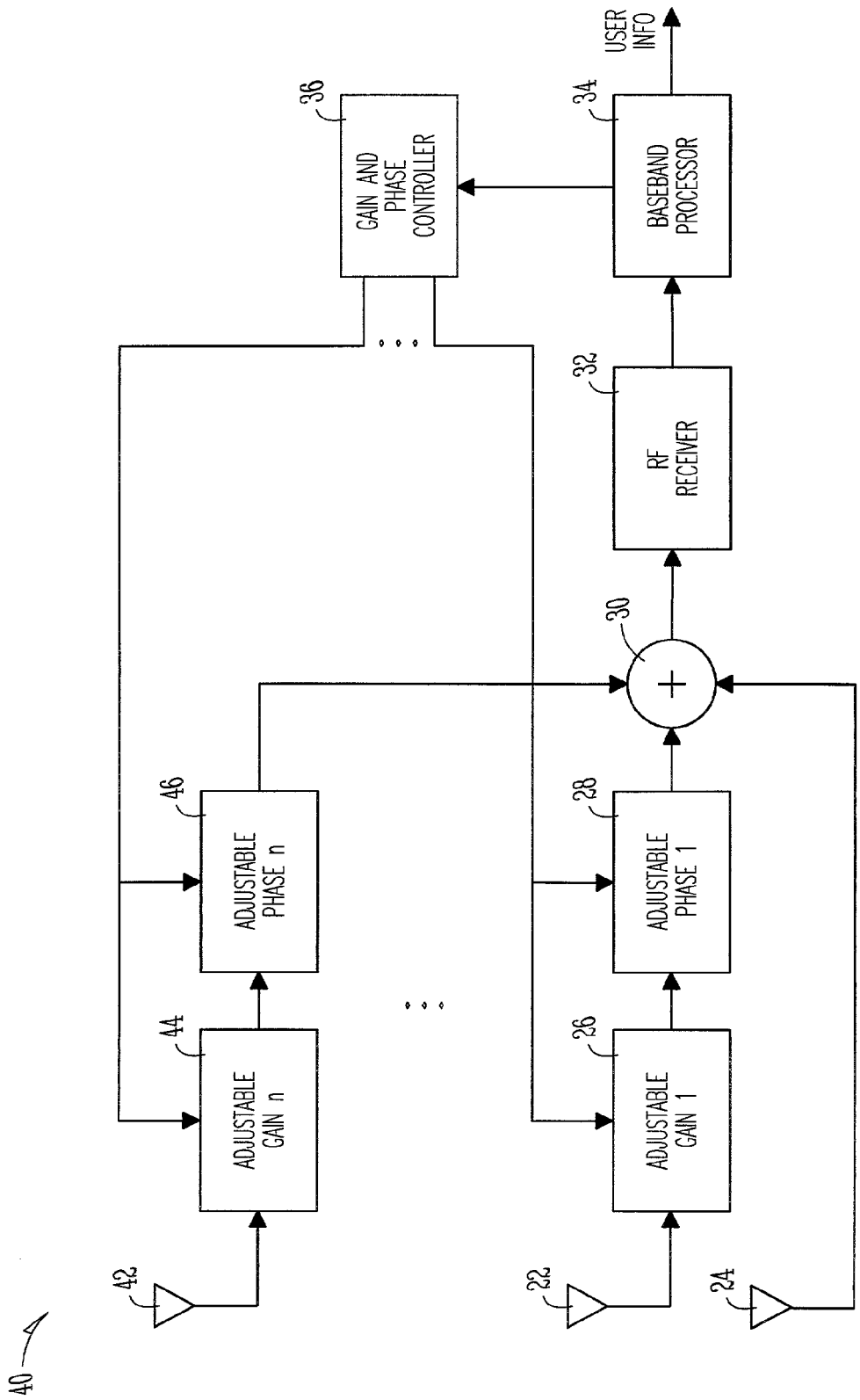
FIG. 3 is a block diagram illustrating a receiver system in accordance with another embodiment of the present invention.

It should be appreciated that more than two antenna elements can be used in accordance with the present invention as long as at least one of the antenna elements has a variable magnitude and/or phase to allow beam steering to occur. For example, FIG. 3 is a block diagram illustrating a receiver system 40 in accordance with another embodiment of the present invention. As illustrated, system 40 includes first and second antenna elements 22, 24 as described in the previous embodiment. System 40 also includes one or more additional antenna elements 42 each having a corresponding adjustable gain unit 44 and adjustable phase unit 46. During system operation, the gain and phase controller 36 delivers gain and phase control information to the adjustable gain and phase units associated with each of the adjustable antenna elements 22, 42. As described above, the gain and phase control information generated by the gain and phase controller 36 is dynamically adjusted during system operation in a manner that reduces interference within the system 40. Any number of adjustable antenna elements may be used.

Figure 4:
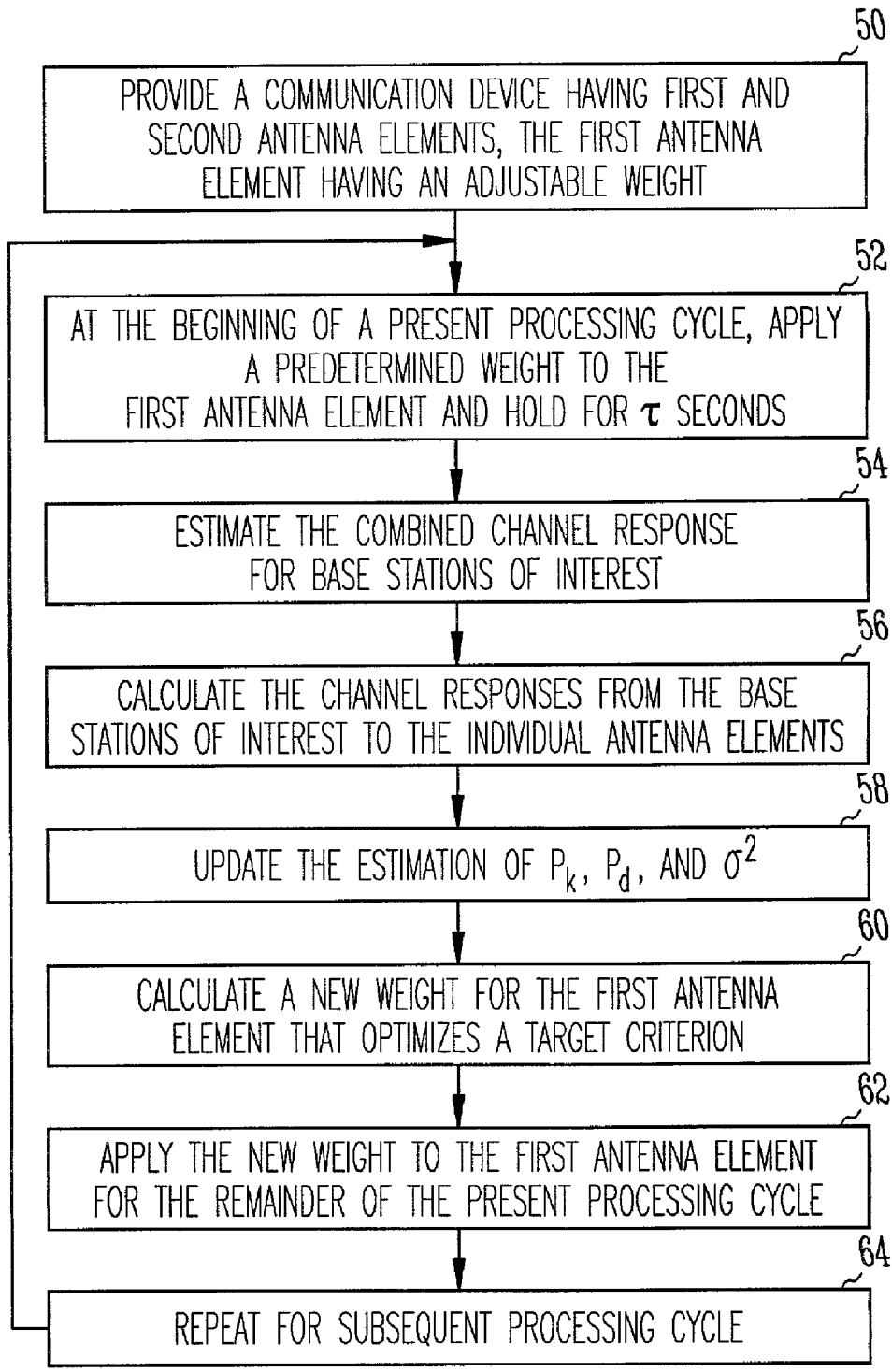
FIG. 4 is a flowchart illustrating a method for reducing interference in a communication device in accordance with an embodiment of the present invention.

FIG. 4 is a flowchart illustrating a method for reducing interference in a communication device in accordance with an embodiment of the present invention. The method may be practiced in connection with, for example, the receiver system 20 of FIG. 2. The method will be described in conjunction with the timing diagram of FIG. 5 which illustrates a number of successive processing cycles (i.e., cycles starting at n−1)T, nT, and (n+1)T, respectively) within the digital system. The cycle time T may be optimized based on, for example, the current Doppler rate (i.e., the mobile speed), which can change in real time during normal system operation. With reference to FIG. 4, a communication device is first provided that includes first and second antenna elements (block 50). The first antenna element has an adjustable weight (magnitude and/or phase). The outputs of the first and second antenna elements are combined within a combiner. At the beginning of a processing cycle (e.g., at nT in FIG. 5), a predetermined weight w (which may be complex) is applied to the first antenna element and held for τ seconds (block 52). As will be described in greater detail, this predetermined weight will allow channel responses to be estimated for channels between each of a plurality of base stations of interest and each individual antenna element of the communication device. In at least one approach, the predetermined weight will set the magnitude of the first antenna element to zero, effectively removing the first antenna element from the system for duration τ. However, other predetermined weights can also be used. The same predetermined weight may be applied to the first antenna element during each successive cycle or different predetermined weights may be applied in successive cycles.

During duration τ of the present processing cycle (see FIG. 5), the combined channel response of the first and second antenna elements is estimated for each of the base stations of interest (block 54). The combined channel response is the response of the first and second antenna elements after combination within the combiner. The combined channel response for a particular base station is estimated using the pilot tone received from that base station. Methods for estimating a channel response using a received pilot tone are known. The base stations of interest may be selected in a variety of different ways. If adequate resources are available, all of the base stations within the system may be treated as base stations of interest. In another approach, the N highest power base stations in the system (i.e., the base stations having the strongest receive signals within the communication device) are selected as the base stations of interest (where N is a positive integer). A list of the highest power base stations is often maintained within a communication device for use in performing handoff operations. In still another approach, all base stations having a detected power level exceeding a predetermined threshold level are used as the base stations of interest. In still another approach, the N strongest paths from different base stations are considered and therefore define the base stations of interest. As will be apparent to persons of skill in the art, other techniques for identifying base stations of interest may also be used.

After the combined channel responses have been estimated, the channel responses associated with the individual antenna elements are calculated for the base stations of interest (block 56). In at least one approach, information associated with a previous processing cycle (e.g., the cycle from (n−1)T to nT in FIG. 5) is used to calculate the channel responses associated with the individual antenna elements for the present processing cycle (e.g., the cycle from nT to (n+1)T in FIG. 5) by solving two equations in two unknowns. The following two vector equations describe the relationship between the combined channel responses and the individual antenna channel responses at time [nT, nT+τ] and [(n−1)T+τ, nT) respectively:

$$\begin{cases} h_k(t) = \tilde{W} C_k(t) & t \in [nT, nT + \tau] \\ h_k(t) = W_{(n-1)T} C_k(t) & t \in [(n-1)T + \tau, nT) \end{cases}$$

where $h_k(t)$ is the combined channel response at time t associated with base station k (where k=0 corresponds to the serving base station) which may be continuously estimated and tracked using well known estimation techniques. $C_k(t)$ is the matrix channel response from base station k to each of the antennas at time t. The element $\{C_k(t)\}_{ij}$ of the matrix $C_k(t)$ represents the channel response of the j'th path at the i'th antenna element. The j index will often be no larger than the maximum number of fingers in the corresponding rake receiver. The vector $W_{(n-1)T}=(w,1)$ is the gain of the antennas during the former time period [(n−1)T+τ, nT). The vector $\tilde{W}$ represents the vector gain of the antennas using the predetermined weight w that is applied at time t=nT and held for period [nT, nT+τ]. The combined channel response $h_k(t)$ for time [nT, nT+τ] has been estimated above (for each base station of interest k). The values of $h_k(t)$ and W for the previous time period [(n−1)T, nT] are known. The vector W that is used for the [(n−1)T+τ, nT] time period includes the new weight that was generated at time (n−1)T+τ (see FIG. 5) and not the predetermined weight. The individual channels ($C_k(t)$) at the end of the (n−1)T period are equal to the ones at the beginning of period nT, whereas the combined channel response ($h_k(t)$) is different due to the different weight vectors ($\tilde{W}$ as opposed to $W_{(n-1)T}$). In order to determine the channel responses associated with the individual antenna elements, the two vector equations are solved for two unknowns at t=nT; namely, the channel responses at each of the antenna elements $C_k(nT)$. This is done for each path of each base station of interest. Similar solutions can be performed for systems using three or more antenna elements.

Using well known estimation techniques, the transmitted power of each of the base stations of interest ($P_k$), the pilot power of the servicing base station ($P_d$), and the white noise variance vector $\sigma=(\sigma_1,\sigma_2)$ at the antennas are estimated (block 58). A new weight for the first antenna element is then calculated that maximizes a predetermined quality criterion (block 60). In one embodiment, the signal to interference and noise ratio (SINR) is used as the quality criterion. In this embodiment, a new weight is determined that maximizes the following equation:

$$SINR = \frac{\left(P_d |(WC_0)*(WC_0)^H|^2\right)}{\frac{1}{SF} P_0 G((WC_0)^H * (WC_0) - diag((WC_0)^H * (WC_0))) + \frac{1}{SF} \sum_{k=1}^{N} P_k G((WC_0)^H * (WC_1)) + \frac{1}{SF}(WC_0)(WC_0)^H((\sigma W^T)(\sigma W^T)^H)}$$

where SF is the pilot spreading factor, the operation G(A) returns the sum of the absolute square of the elements of matrix A, $X^H$ is the conjugate transpose of matrix X, and $X^T$ is the normal transpose of matrix X. It should be appreciated that the last term in the denominator of the above equation relates to white Gaussian noise in the channel and in some cases can be ignored. Other quality criteria that may be used include, for example, the mean square error (MSE) of the pilot signal, the bit error rate (BER) at the output of the rake receiver, and others. In one approach, the new weight is selected from a finite set of predetermined weights. By using a finite set of possible weights, overall system complexity can be reduced.

Figure 5:
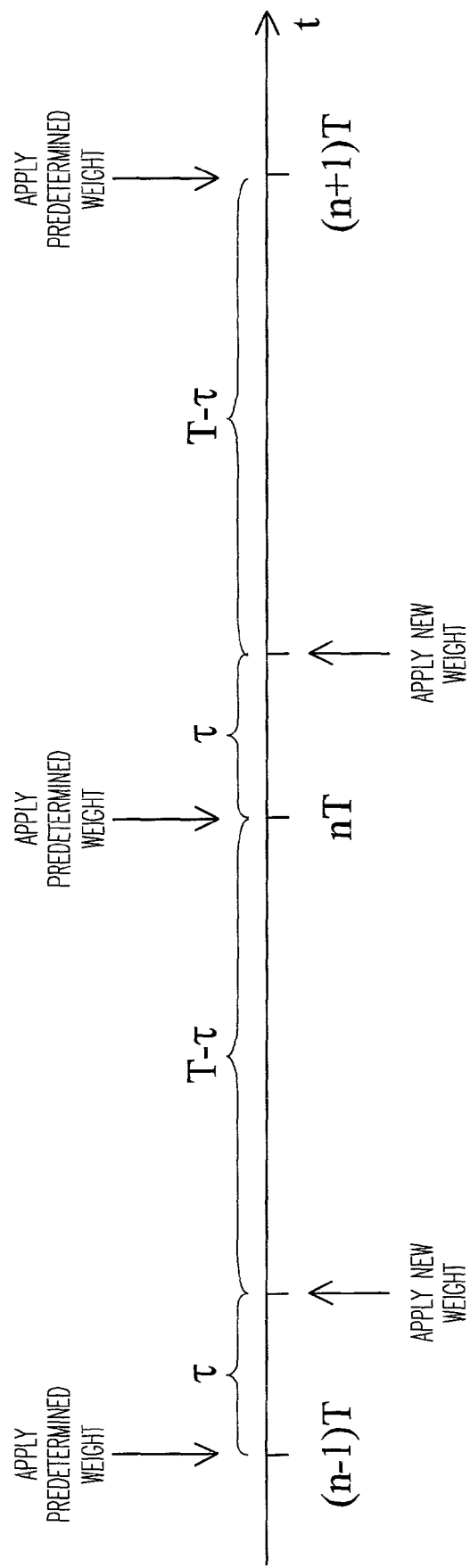
FIG. 5 is a timing diagram illustrating the timing associated with the method of FIG. 4 in accordance with an embodiment of the present invention.

After the new weight w has been determined, the weight is applied to the first antenna element for the remainder of the present processing cycle (i.e., for the next T−τ seconds, as illustrated in FIG. 5) (block 62). The above described process is then repeated for subsequent processing cycles (block 64). In this manner, the receive beam of the communication device is continuously adjusted to achieve a reduced level of interference within the communication device. The above described method may be modified for use in systems having more than two antenna elements (e.g., receiver system 40 of FIG. 3).

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for reducing interference in a communication device comprising:
   providing a communication device having first and second antenna elements and a radio frequency combiner to combine outputs of said first and second antenna elements, said first antenna element having an adjustable weight;
   said communication device further having a single radio frequency (RF) receiver path to receive the combined outputs and produce a baseband communications signal;
   determining individual channel responses for said first and second antenna elements for each of a plurality of base stations of interest at the baseband communication signal; and
   determining a weight for said first antenna element that optimizes an interference-related quality criterion based on said individual channel responses using phased array principles to direct a receive beam.

2. The method of claim 1 wherein:
said communication device includes more than two antenna elements, wherein said combiner combines the outputs of said more than two antenna elements.

3. The method of claim 1 wherein determining individual channel responses includes:
applying a predetermined weight to said first antenna element;
estimating a combined channel response for a channel between a first base station of interest and an output of said combiner while said predetermined weight is being applied; and
calculating an individual channel response for a channel between said first base station of interest and said first antenna element using said estimated combined channel response.

4. The method of claim 3 wherein:
calculating an individual channel response includes determining a weight previously applied to said first antenna element and using said previously applied weight to calculate said individual channel response.

5. The method of claim 1 wherein:
said weight is a complex weight having a magnitude-related component and a phase-related component.

6. The method of claim 1 wherein:
said interference-related quality criterion includes a signal to interference and noise ratio (SINR).

7. The method of claim 1 wherein:
said interference-related quality criterion includes a bit error rate (BER).

8. The method of claim 1 wherein:
said interference-related quality criterion includes a mean square error (MSE).

9. The method of claim 1 wherein:
determining a weight includes selecting a weight from a predefined set of possible weights.

10. A method for reducing interference in a communication device comprising:
providing a communication device having first and second antenna elements, said first antenna element having an adjustable weight;
applying a predetermined weight to said first antenna element;
combining the RF outputs of the first and second antenna elements;
converting the combined RF outputs to produce a baseband signal;
estimating a combined channel response for said first and second antenna elements at the baseband signal while said predetermined weight is being applied for a first base station of interest;
calculating individual channel responses for channels between said first and second antenna elements and said first base station of interest using said estimated combined channel response; and
determining a new weight for said first antenna element that enhances an interference-related quality criterion using said individual channel responses to allow beam steering.

11. The method of claim 10 comprising:
repeating estimating a combined channel response and calculating individual channel responses for each of a plurality of base stations of interest.

12. The method of claim 10 wherein:
estimating a combined channel response includes identifying and using a pilot signal received from said first base station of interest.

13. The method of claim 10 wherein:
applying a predetermined weight includes forcing a magnitude associated with said first antenna element to zero.

14. The method of claim 10 wherein:
said interference-related quality criterion includes a signal to interference and noise ratio (SINR).

15. A method for reducing interference in a communication device comprising:
providing a communication device having first and second antenna elements, said first antenna element having an adjustable weight;
applying a predetermined weight to said first antenna element during a present time period;
combining the RF outputs of the first and second antenna elements;
converting the combined RF outputs to produce a baseband signal;
estimating a combined channel response for said first and second antenna elements from the baseband signal while said predetermined weight is being applied for a first base station of interest;
calculating individual channel responses for channels between each of said first and second antenna elements and said first base station of interest for said present time period using said combined channel response;
determining a new weight for said first antenna element for said present time period that enhances an interference-related quality criterion using said individual channel responses; and
applying said new weight to said first antenna element during said present time period to allow beam steering of the antenna elements.

16. The method of claim 15 comprising:
repeating estimating a combined channel response and calculating individual channel responses for each of a plurality of base stations of interest before determining said new weight.

17. The method of claim 15 wherein:
calculating individual channel responses includes using antenna weight information from a previous time period.

18. The method of claim 15 wherein:
calculating individual channel responses includes using combined channel response information from a previous time period.

19. The method of claim 15 wherein:
calculating individual channel responses includes solving M equations in M unknowns, where M is an integer greater than 1.

20. The method of claim 15 wherein:
calculating individual channel responses includes solving the following system of equations for $C_1(t=nT)$:

$$\begin{cases} h_1(t) = \tilde{W} C_1(t) & t \in [nT, nT + \tau] \\ h_1(t) = W_{(n-1)T} C_1(t) & t \in [(n-1)T + \tau, nT) \end{cases}$$

where $h_1(t)$ is the estimated combined channel response for the first base station of interest at time t, $W_{(n-)T}$ is the calculated vector gain of the antenna elements during previous period $[(n-1)T+\tau, nT)$, $C_1(t)$ is the matrix channel response of the first base station of interest for each of the antenna elements at time t, and $\tilde{W}$ is the vector gain of the antennas using the predetermined weight.

21. The method of claim 15 wherein:

said interference-related quality criterion includes a signal to interference and noise ratio (SINR).

22. The method of claim 15 further comprising:

repeating applying a predetermined weight, estimating a combined channel response, calculating individual channel responses, determining a new weight, and applying said new weight for a subsequent time period.

23. A communication device comprising:

first and second antenna elements, said first antenna element having an adjustable weight to allow receive beam steering;

a radio frequency combiner to combine outputs of said first and second antenna elements to generate a combined signal;

a single RF receiver path to convert the combined outputs of said first and second antenna elements to produce a baseband signal; and a controller connected to receive the baseband signal and to control said adjustable weight of said first antenna element, said controller including:
- a first unit to determine individual channel responses for said first and second antenna elements for each of a plurality of base stations of interest; and
- a second unit to determine a weight for said first antenna element that optimizes an interference-related quality criterion using the individual channel responses.

24. The communication device of claim 23 comprising:

at least one additional antenna element, wherein said combiner combines outputs of said first antenna element, said second antenna element, and said at least one additional antenna element to generate said combined signal and wherein said first unit determines individual channel responses for said first antenna element, said second antenna element, and said at least one additional antenna element for each of the base stations of interest.

25. The communication device of claim 23 wherein:

said controller repeatedly updates said weight of said first antenna element.

26. The communication device of claim 25 wherein:

said controller updates said weight of said first antenna element at intervals that depend upon a Doppler rate associated with said communication device.

27. The communication device of claim 23 wherein:

said interference-related quality criterion includes a signal to interference and noise ratio (SINR).

28. The communication device of claim 23 wherein:

said first unit regularly applies a predetermined weight to said first antenna element for use in determining said individual channel responses.

29. The communication device of claim 23 wherein:

said first unit determines said individual channel responses for said first and second antenna elements using a combined channel response for said first and second antenna elements for each base station of interest.

* * * * *

UNITED STATES PATENT AND TRADEMARK OFFICE
CERTIFICATE OF CORRECTION

PATENT NO. : 7,039,135 B2 Page 1 of 1
APPLICATION NO. : 09/976200
DATED : May 2, 2006
INVENTOR(S) : Binshtok et al.

It is certified that error appears in the above-identified patent and that said Letters Patent is hereby corrected as shown below:

On the face page, in field (56), under "Foreign Patent Documents", in column 2, line 1, after "4/2001" insert - - H01Q/3/26 - -.

In column 8, line 62, in Claim 20, delete "t, $W_{(n-)T}$" and insert - - t, $W_{(n-1)T}$ - -, therefor.

Signed and Sealed this

Fifth Day of September, 2006

JON W. DUDAS
*Director of the United States Patent and Trademark Office*